US009778991B2

(12) United States Patent
Schreter et al.

(10) Patent No.: US 9,778,991 B2
(45) Date of Patent: Oct. 3, 2017

(54) EXPORTING AND IMPORTING DATABASE TABLES IN A MULTI-USER DATABASE ENVIRONMENT

(71) Applicants: Ivan Schreter, Mannheim (DE); Muhammed Sharique, Pune (IN); Deepak Shrivastava, Pune (IN); Mihnea Andrei, Issy les Moulineaux (FR)

(72) Inventors: Ivan Schreter, Mannheim (DE); Muhammed Sharique, Pune (IN); Deepak Shrivastava, Pune (IN); Mihnea Andrei, Issy les Moulineaux (FR)

(73) Assignees: SAP SE, Walldorf (DE); SAP GLOBAL IP GROUP, Walldorf (DE)

( * ) Notice: Subject to any disclaimer, the term of this patent is extended or adjusted under 35 U.S.C. 154(b) by 366 days.

(21) Appl. No.: 14/553,548

(22) Filed: Nov. 25, 2014

(65) Prior Publication Data

US 2016/0147809 A1    May 26, 2016

(51) Int. Cl.
*G06F 17/30* (2006.01)
*G06F 11/14* (2006.01)
*G06F 15/16* (2006.01)

(52) U.S. Cl.
CPC .... *G06F 11/1446* (2013.01); *G06F 17/30368* (2013.01); *G06F 17/30377* (2013.01)

(58) Field of Classification Search
None
See application file for complete search history.

(56) References Cited

U.S. PATENT DOCUMENTS

| | | | |
|---|---|---|---|
| 2003/0069902 A1* | 4/2003 | Narang | G06F 17/30551 |
| 2007/0106711 A1* | 5/2007 | Buros | G06F 17/30563 |
| 2012/0047126 A1* | 2/2012 | Branscome | G06F 17/30519 |
| | | | 707/714 |
| 2013/0297579 A1* | 11/2013 | Andrew | G06F 8/71 |
| | | | 707/698 |

* cited by examiner

*Primary Examiner* — Alex Gofman
(74) *Attorney, Agent, or Firm* — Sterne, Kessler, Goldstein & Fox P.L.L.C.

(57) ABSTRACT

Disclosed herein are system, method, and computer program product embodiments for exporting and importing database tables in a database management system using multi-version concurrency control (MVCC). An embodiment operates by first initiating an export of a database table in the database management system. During the export transaction, temporary creation and deletion timestamps are identified from MVCC information associated with each row in the database table. Each temporary timestamp is associated with a database transaction. A timestamp map is then generated that associates the identified temporary timestamps with commit timestamps of the associated transactions. The database table, associated MVCC information, timestamp map, and snapshot timestamp of the export transaction are written to a binary file. When an import of the database table is initiated in a database management system, the database table is reconstructed from the table rows, associated MVCC information, timestamp map, and snapshot timestamp of the export transaction in the binary file.

17 Claims, 6 Drawing Sheets

EXPORTING AND IMPORTING DATABASE TABLES IN A MULTI-USER DATABASE ENVIRONMENT

BACKGROUND

Data frequently changes in the rows of tables of a database management system. When data is accessible to multiple threads in the database management system, multiple transactions may independently manipulate the rows and the data. The changes to rows made by each transaction may be temporary until the transaction is committed in the system.

To track changes to the same rows made by multiple transactions, the database management system uses a multi-version concurrency control (MVCC) mechanism. The MVCC mechanism maintains multiple versions of a row in order to track changes made to the row by each of the transactions. Each version of the row may be assigned a creation and/or deletion timestamp, and these timestamps are temporary while a transaction is still active. When a transaction has been committed and the changes are made permanent, a separate post commit thread is typically executed to update the temporary timestamps with the transaction's commit time.

In a high volume transactional database, table data may be exported periodically for backup and recovery purposes. Due to availability requirements, an export may be executed in parallel with active transactions and post commit threads. Therefore, a solution is needed to properly export rows containing temporary timestamps that have not been updated at the time of export.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for exporting and importing database tables in a database management system using multi-version concurrency control.

Figure 1:
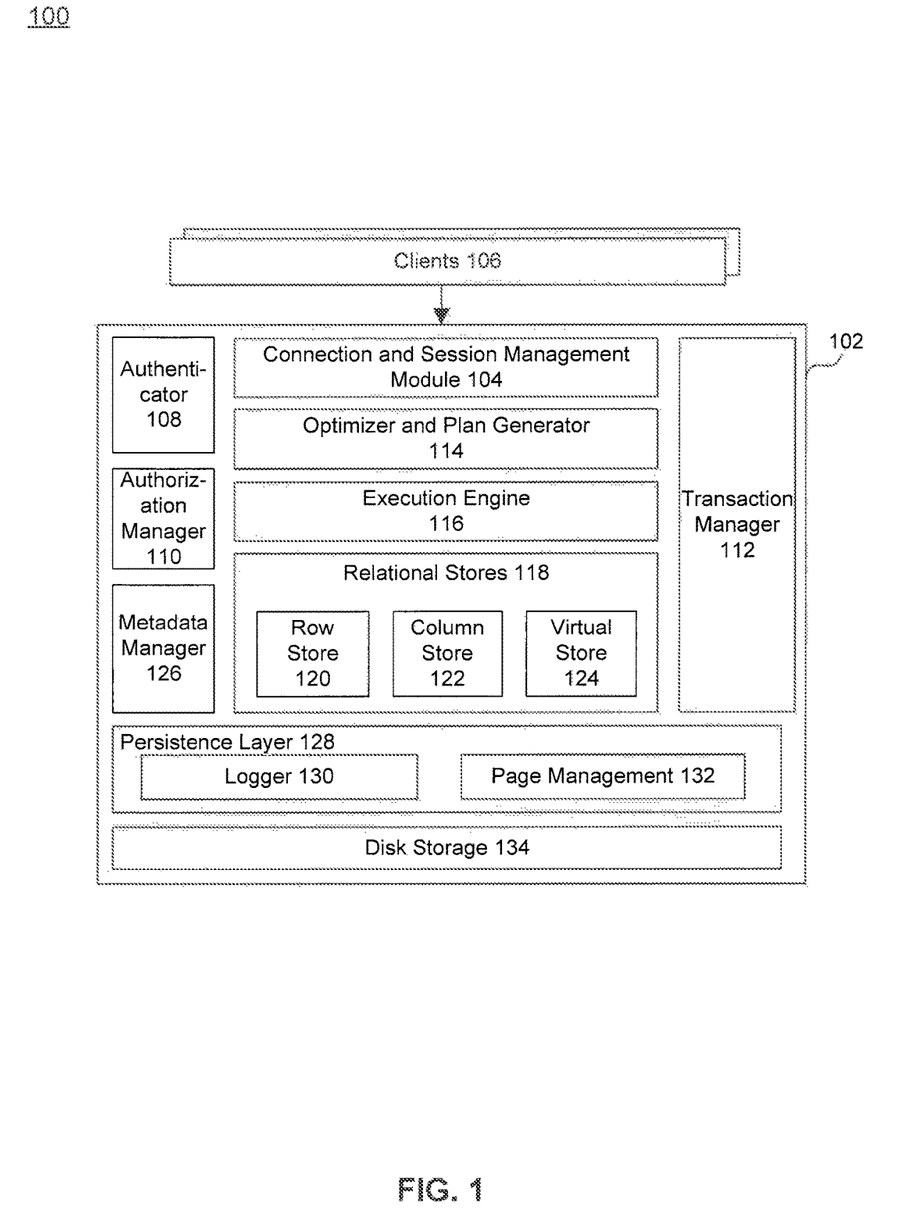
FIG. 1 is a block diagram of an exemplary database management system, according to an embodiment.

FIG. 1 is a block diagram 100 of an exemplary database management system. Database management system 102 may be a memory-centric data management system that leverages hardware capabilities, such as vast main memory space and multi core CPU and GPU processors, described in detail in FIG. 6.

In an embodiment, database management system 102 includes a connection and session management module 104. Connection and session management module 104 creates and manages sessions and connections for database clients or simply clients 106. Clients 106 may be computing devices under a control of a user (also referred to as client devices) that access and/or execute business applications. Business applications are custom or generic applications that may include, for example, applications related to social media, bio-informatics, and business processing, and that store and manipulate data in database management system 102.

Once connection and session management module 104 establishes a session with database management system 102, clients 106 may use one or more database languages, to manipulate data. Examples of database languages include a structured query language (SQL), SQL Script (a scripting language for describing application specific calculations inside the database), MultiDimensional eXpressions (MDX), WIPE (weakly structure information processing and exploration) for data graph processing, and FOX (for planning applications).

In an embodiment, an established connection may be authenticated using authenticator 108. Authenticator 108 authenticates clients 106 to database management system 102. For example, authenticator 108 may verify that a user using client 106 has a necessary user name and password to access data in database management system 102.

In an embodiment, database management system 102 may include an authorization manager 110. Authorization manager 110 may determine whether a user has the required privileges to execute the requested operations. A privilege grants a right to perform a specified operation (such as create, update, select, or execute).

Transaction manager 112 is a component that coordinates transactions, controls transactional isolation and keeps track of running and closed transactions. In an embodiment, running transactions may be temporary transactions and closed transactions may be permanent or committed transactions.

In an embodiment, client 106 may issue a client request to database management system 102. The client request may manipulate one or more rows in a table of a database management system 102. For example, the client request may insert, update or delete data in a particular row of a table.

When database management system 102 receives a client request, the client request may initially be processed in accordance with the language of the client request, such as, SQL, SQL script, MDX, WIPE, FOX, etc. For example, a client request including a SQL statement may be processed using a SQL processing module (not shown). The SQL processing module processes structured data, such as row- and column-oriented physical representations of relational tables in database management system 102.

After the initial processing, the client request may be converted into a format that is common to processing requests in database management system 102 and forwarded to an optimizer and plan generator 114. In an embodiment, optimizer and plan generator 114 parses and optimizes the client requests. For example, optimizer and plan generator 112 may generate an execution plan for executing the client request in database management system 102. Once generated, optimizer and plan generator 114 passes the execution plan to execution engine 116.

In an embodiment, execution engine 116 processes the execution plan. To process the execution plan, execution engine 116 accesses data stored in tables of database management system 102. Example tables may be stored in relational stores 118. Relational stores 118 may include a row store 120 and a column store 122. In an embodiment, relational stores 118 may be included in one or more memory structures that are discussed in detail in FIG. 6.

In an embodiment, row store 120 stores relational tables in a row format.

In an embodiment, column store 122 stores relational tables in a column format.

In an embodiment, relational store 118 also includes a virtual store 124. Virtual store 124 is a virtual relational data store that provides access to remote data in external systems through virtual tables. These virtual tables may be accessed through virtual store 124 using, for example, SQL statements.

In an embodiment, metadata manager 126 manages metadata in database management system 102. Example metadata includes definitions of relational tables, columns, views, indexes and procedures. In an embodiment, metadata manager 126 may be coupled to a database catalog for relational stores 118. In one embodiment, the database catalog may be stored in tables in row store 120.

In an embodiment, persistence layer 128 provides durability and atomicity to transactions. For example, persistence layer 128 ensures that data in database management system 102 is restored to the most recent committed state after a restart and that transactions are either completely executed or completely undone. To achieve this goal in an efficient manner, persistence layer 128 may use a combination of write-ahead logs, shadow paging and save points. In an embodiment, persistence layer 128 also offers interfaces for writing and reading persisted data.

In an embodiment, persistence layer 128 includes a logger 130. Logger 130 logs data, changes in data, and transaction requests to a memory storage disk. Those transactions and data changes may be performed by execution engine 116.

Page management module 132 provides an interface for writing and reading data from memory cache and disk storage for processing from row store 118.

Disk storage 134 is a long term memory storage that stores data. For example, data stored in row stores 118 that is no longer frequently accessed may be moved to disk storage 134. Exemplary disk storage 134 may be one of non-volatile memories that are discussed in detail in FIG. 6. When client 106 requests data in disk storage 134, database management system 102 may more the data from disk storage 134 into row store 118. Once moved, the database management system 102 may send the data to client 106 as part of a response message.

Figure 2:
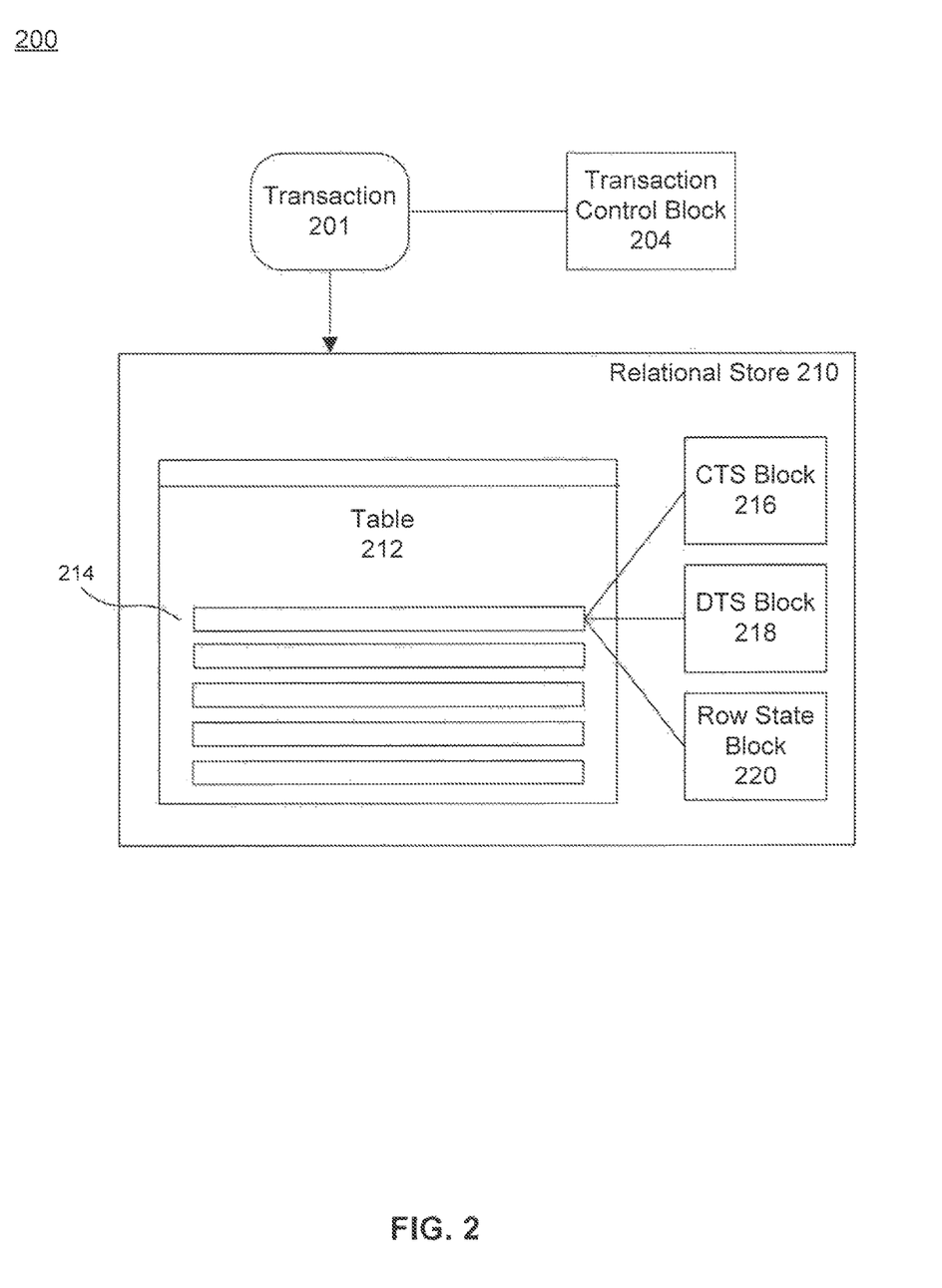
FIG. 2 is a block diagram of a relational store, according to an embodiment.

FIG. 2 is a block diagram 200 of a relational store, according to an embodiment. Block diagram 200 may be of a row-oriented store, a column-oriented store, or another memory store. Relational store 210 may be a combination of memory storage coupled with modules that execute on a processor and execute instructions on relational store 210, as discussed in FIG. 6.

When client 106 issues instructions that manipulate data in relational store 210, these instructions may manipulate data in rows of a table, such as table 212. For example, client 106 may issue instructions that include insert, update, or delete operations on rows 214 in table 212 of row store 210. In an embodiment, one or more instructions may be referred to as a transaction. In a further embodiment, transactions issued by client 106 are active transactions that temporarily manipulate data in database management system 102. An active transaction becomes a closed transaction when client 106 issues a "commit" instruction. Upon a "commit" instruction, the data changes made to rows 214 of table 212 in relational store 210 become permanent in database management system 102.

In an embodiment, when a transaction is an active transaction, multiple clients 106 can issue requests that manipulate data in the same row of a same table. For example, a request from each client 106 can spawn a database management system thread that performs transactions for a particular client 106 in parallel with other threads for other clients 106. Because multiple threads manipulate the same row in table 212, database management system 102 uses multi-version concurrency control (MVCC) to determine the correct value for the row in table 212 after multiple threads complete manipulating the data in the row.

In an embodiment, an insert or update instruction creates a new row in table 212. In this manner, rows are not updated in place; instead, a new row is created in table 212 that represents a new version of the row. Each row 214 is associated with MVCC information that includes a creation and a deletion timestamp for the row. For example, an insert instruction may create a new row in table 212 and store its creation timestamp in associated MVCC information. When the row is updated, the current row is assigned a deletion timestamp, and a new row is created with a creation timestamp of the same value. A delete instruction may simply assign a deletion timestamp to the row. In an embodiment, the MVCC information associated with each row 214 may include one or more MVCC blocks, such as creation timestamp (CTS) block 216 and deletion timestamp (DTS) block 218. Creation and deletion timestamps associated with rows 214 may be stored in separate MVCC blocks, as illustrated in FIG. 2.

In an embodiment, the MVCC information associated with each row 214 may also include a row state for each row. In a further embodiment, row states may be stored in separate MVCC blocks associated with each row, such as row state block 220. The row state of a row may indicate the visibility of a row. As part of the MVCC mechanism used by database system 102, multiple versions of data may be maintained. The version accessible to an active transaction is typically the latest version at the time the transaction began. Multiple rows in a database table may refer to different versions of the same data, and the visibility of a row, as indicated by the row state, denotes whether the row is accessible to subsequent transactions in the database management system. In an embodiment, row states may be determined based on creation and deletion timestamps associated with each row.

In an embodiment, after transactions are "committed," the changes to the rows in table 212 become permanent. Once transactions are committed, changes to the data from the committed transactions become visible to other threads in database management system 102. For example, rows with data that is inserted or updated in table 212 may be visible to multiple threads and rows with data that is deleted may be invisible to multiple threads.

In an embodiment, an active transaction, such as transaction 202, may populate CTS blocks 216 and/or DTS block 218 with temporary creation and deletion timestamps. In an embodiment, these temporary timestamps may represent the start time of transaction 202. For example, if transaction 202 includes an insert operation, a new row may be created in table 212, and the start time of transaction 202 may temporarily be written to the row's corresponding CTS block 216 as the creation timestamp of the row. When transaction 202 is committed, a commit timestamp is written to the corresponding transaction control block 204 of transaction 202. Transaction control block 204 may include various information about transaction 202.

In an embodiment, once transaction 202 is committed, a post commit thread may be scheduled to process rows in table 212 that have been affected by transaction 202. The post commit thread may execute in parallel with other post commit threads. In an embodiment, the post commit thread iterates through rows 214 of table 212 that have been inserted or deleted by transaction 202 and replaces the appropriate creation and deletion timestamps in CTS block 216 and DTS block 218 with the commit timestamp stored in transaction control block 204.

Commonly, the post commit process, as previously described, may not occur immediately after a transaction is committed. For the period of time after the transaction is committed and before the post commit process is executed, affected rows 214 in table 212 may still be associated with temporary creation and deletion timestamps. When a table is exported from relational store 210, proper steps must be taken to ensure a consistent view of the table is stored, and that the table and correct row states may be reconstructed from the exported information.

Figure 3:
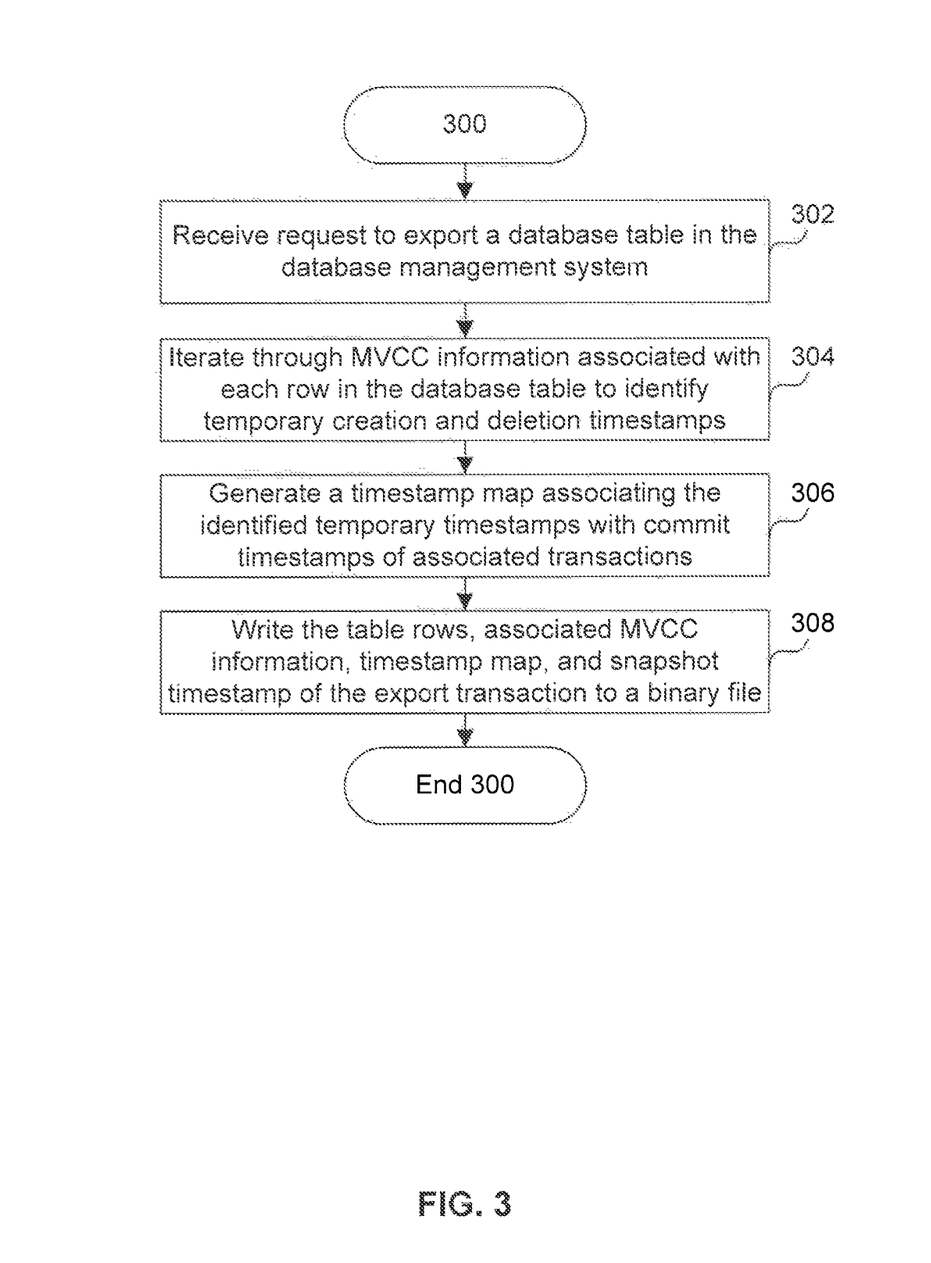
FIG. 3 is a flowchart illustrating a process for exporting a database table in a database management system using multi-version concurrency control, according to an embodiment.

FIG. 3 is a flowchart illustrating a process for exporting a database table in a database management system using multi-version concurrency control. Method 300 may be performed by processing logic that may comprise hardware (e.g., circuitry, dedicated logic, programmable logic, microcode, etc.), software (e.g., instructions run on a processing device), or a combination thereof.

In step 302, a request is received to export a database table in database management system 102. In an embodiment, the export transaction saves a consistent view of the database table at a particular point in time, referred to as a snapshot of the database table. In step 304, MVCC information associated with each row in the database table is iterated to identify temporary creation and deletion timestamps. In an embodiment, these temporary timestamps may reside in creation and deletion MVCC blocks associated with each database row. Each temporary timestamp is associated with a particular transaction that inserted, updated, or deleted the corresponding row. As described above with respect to FIG. 2, these temporary timestamps may be present due to an active or committed transaction for which a post commit process has not yet been completed.

In step 306, a timestamp map is generated that associates the identified temporary timestamps with commit timestamps of the associated transactions. In an embodiment, a commit timestamp for each transaction may reside in a transaction control block associated with the transaction. Further details of the timestamp map generation are described with respect to FIG. 4. This timestamp map may be used during the import process to correct temporary timestamps with associated transaction commit timestamps, as described with respect to FIG. 5.

In step 308, the table rows, associated MVCC information, and generated timestamp map are written to a binary file. In an embodiment, the snapshot timestamp of the export transaction, indicating the snapshot time of the database table, is also written to the binary file.

Figure 4:
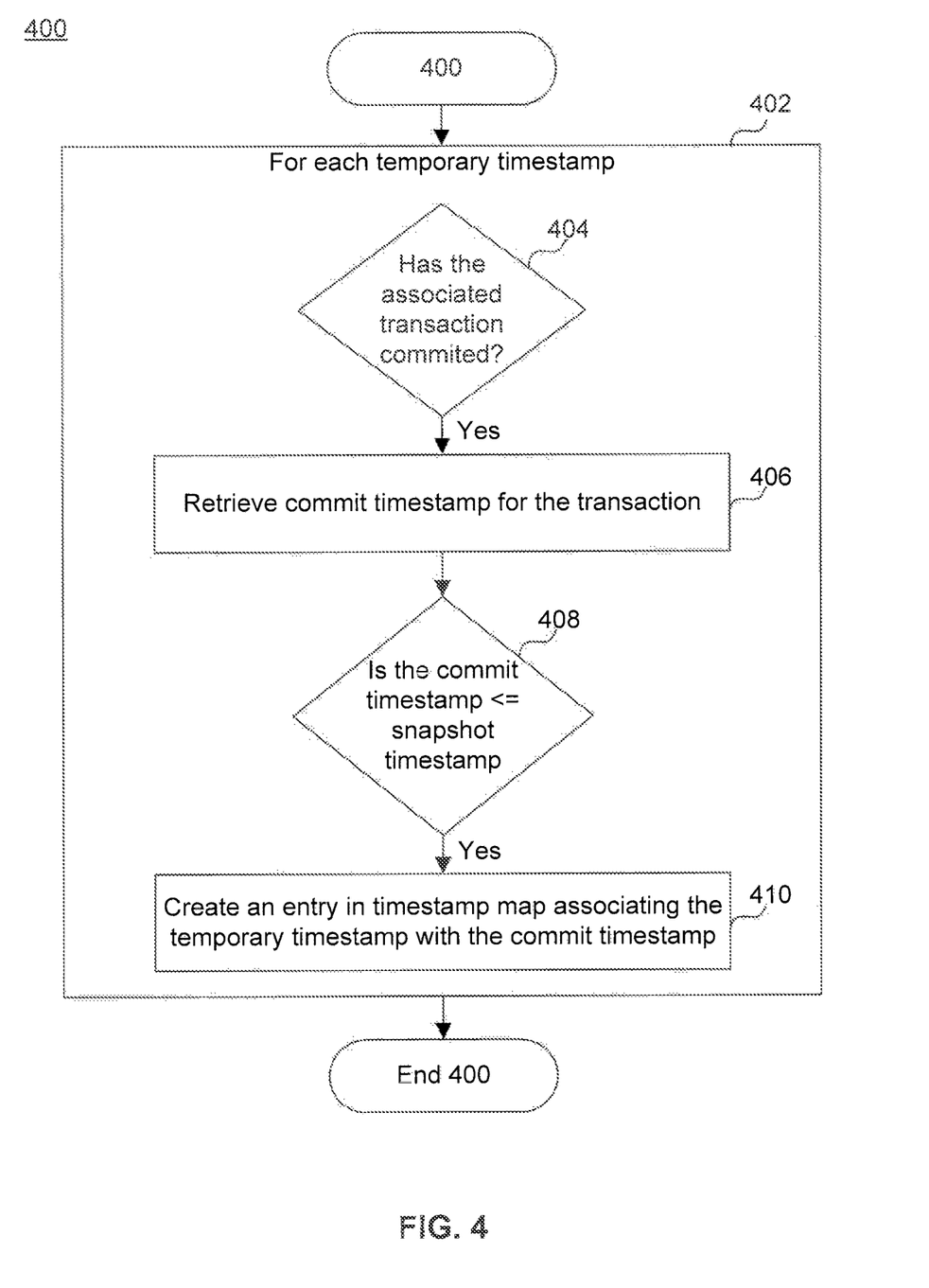
FIG. 4 is a flowchart illustrating a process for generating a timestamp map associated temporary creation and deletion timestamps with commit timestamps of an associated transaction, according to an embodiment.

FIG. 4 is a flowchart illustrating a process for generating a timestamp map associated temporary creation and deletion timestamps with commit timestamps of the associated transaction. Iterative step 402 includes steps 404, 406, 408, and 410, which may be performed for each temporary timestamp identified in step 304 of method 300.

In step 404, it is determined whether the transaction associated with the temporary timestamp has been committed. If the transaction has been committed, the method proceeds to step 406 and retrieves the commit timestamp for the transaction. In an embodiment, the commit timestamp resides in a transaction control block associated with the transaction. The transaction control block may include various information about the transaction.

In step 408, it is determined whether the retrieved commit timestamp is less than or equal to the snapshot timestamp of the export transaction. If so, the method proceeds to step 410. In step 410, an entry is created in the timestamp map associating the temporary timestamp with the retrieved commit timestamp. In an embodiment, the timestamp map may be implemented as an associative array, such as a hash table, in which the temporary timestamp acts as a key. Although multiple database rows may be associated with the same temporary timestamp, the timestamp map need only include one entry for a particular temporary timestamp.

In an embodiment, the timestamp map entries contain the actual temporary and commit timestamps. In various embodiments, the entries may instead contain references to the timestamp values. For example, an entry may include a row identifier or an MVCC block identifier that may be used to retrieve the temporary timestamp value. In another example, an entry may include a transaction identifier that may be used to retrieve the commit timestamp value from the transaction control block of the transaction.

Returning to step 404, if the associated transaction has not been committed, the method iterates to the next identified temporary timestamp. The method ends once all identified temporary timestamps have been visited.

In an embodiment, an export transaction may be part of another internal transaction. For example, a table migration, move, or split may be considered an internal transaction within database management system 102. In this case, the internal transaction may initiate the export request and all changes caused by the internal transaction should be viewed as committed by the export transaction. Accordingly, in an embodiment, entries may be created in the timestamp map that associate temporary timestamps created by the internal transaction with a predefined commit timestamp. The predefined commit timestamp may indicate that the internal transaction should be evaluated as a transaction that has committed prior to the snapshot timestamp of the export transaction. Thus, as will be discussed further with respect to FIG. 5, the changes made by the internal transaction will be reflected when the exported table is later imported.

Figure 5:
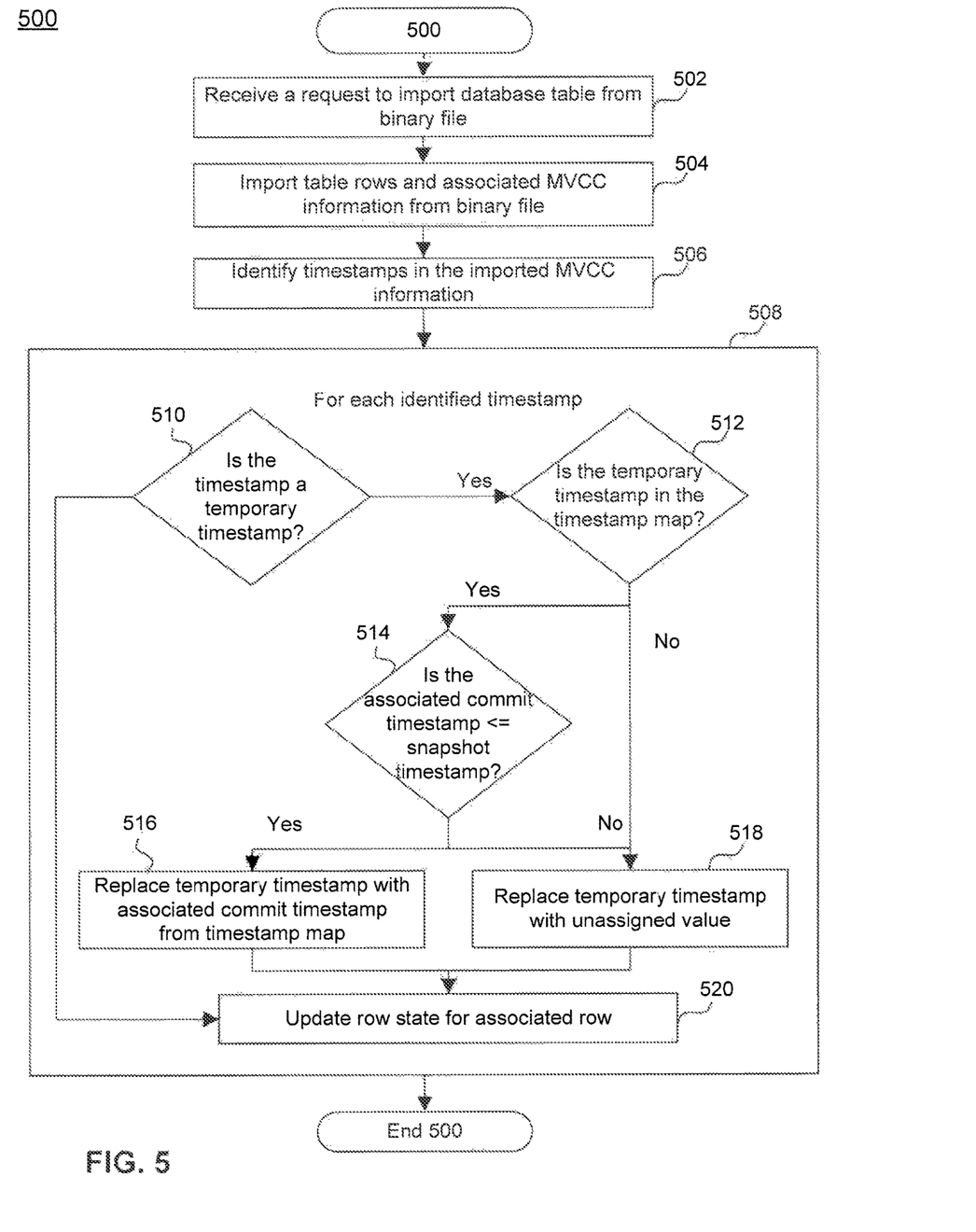
FIG. 5 is a flowchart illustrating a process for importing a database table into a database management system from a binary file, according to an embodiment.

FIG. 5 is a flowchart illustrating a process for importing a database table into a database management system, such as database management system 102, from a binary file. In an embodiment, the database table may be exported from and imported into the same or separate database management systems. Method 500 may be performed by processing logic that may comprise hardware (e.g., circuitry, dedicated logic, programmable logic, microcode, etc.), software (e.g., instructions run on a processing device), or a combination thereof.

In step 502, a request is received to import a database table from a binary file. In an embodiment, the import process creates and reconstructs the database table in relational store 210. In step 504, the rows of the database table and associated MVCC information are first imported from the binary file. The temporary timestamps contained in the MVCC information for each row at the snapshot time of the database table may be imported without modification. In step 506, created and deleted timestamps for each row are identified in the imported MVCC information.

Iterative step 508 includes steps 510, 512, 514, 516, 518, and 520, which may be performed for each timestamp identified in step 506. In step 510, it is determined whether the timestamp is a temporary timestamp. In an embodiment, the MVCC information includes a temporary indicator that may be associated with a creation or deletion timestamp. If the timestamp is a temporary timestamp, the method proceeds to step 512. Otherwise, the method proceeds to step 518.

In step 512, the timestamp map from the binary file is searched to determine whether an entry containing the temporary timestamp exists in the map. If so, the method proceeds to step 514. In step 514, the associated commit timestamp in the timestamp map is retrieved and compared to the snapshot timestamp of the export transaction. If the retrieved commit timestamp is less than or equal to the snapshot timestamp of the export transaction, the method proceeds to step 516. In step 516, the temporary timestamp is replaced with the associated commit timestamp. For example, at the snapshot time, a row may have been created and the associated transaction committed in database management system 102. However, the temporary creation timestamp associated with the row may not have been updated with the transaction's commit timestamp prior to exporting the database table. During the import process, the temporary creation timestamp of the row may now be updated with the correct commit timestamp of the associated transaction using the exported timestamp map. In step 514, if the retrieved commit timestamp is greater than the snapshot timestamp of the export transaction, the method proceeds to step 518. In step 518, the temporary timestamp is replaced with an unassigned value, as the transaction's commit would not have been known at the snapshot time, and thus the transaction's changes should not be reflected in the imported table.

Returning to step 512, if the temporary timestamp does not appear in the timestamp map, the method proceeds to step 518 where the temporary timestamp is replaced with an unassigned value. For example, this situation may occur when a transaction is active but has not yet committed by the snapshot timestamp of the export transaction. The method then proceeds to step 520.

In step 520, the row state of the associated row in the imported table may be updated. In an embodiment, row states may be stored in the MVCC information associated with each row and indicate the visibility of each row. In a further embodiment, row states may be stored in separate MVCC blocks associated with each table row.

As described with respect to FIG. 2, as part of the MVCC mechanism used by database system 102, multiple versions of data may be maintained. The version accessible to an active transaction is typically the latest version at the time the transaction began. Multiple rows in a database table may refer to different versions of the same data, and the visibility of a row, as indicated by the row state, denotes whether the row is accessible to subsequent transactions in the database management system.

The row state of each row is determined based on the creation and deletion timestamps of the row and the export time of the database table. If the creation timestamp is unassigned or the deletion timestamp is less than the snapshot timestamp of the export transaction, the row state may be set to a value indicating that the row is not visible. For example, the row may have been created by a transaction that committed after the snapshot timestamp of the export transaction, or the row may have been deleted by a transaction that committed prior to the snapshot timestamp of the export transaction. Alternatively, if the creation timestamp is less than the snapshot timestamp of the export transaction and the deletion timestamp is either unassigned or greater than the snapshot timestamp of the export transaction, the row state may be set to a value indicating that the row is visible.

In an embodiment, a row state may be assigned a value of zero, indicating that the row is visible, or one, indicating that the row is not visible. In various embodiments, the value of a row state may be represented as a bit or bit array, an integer, a string, or any logical data type that may represent the visibility of a row.

Figure 6:
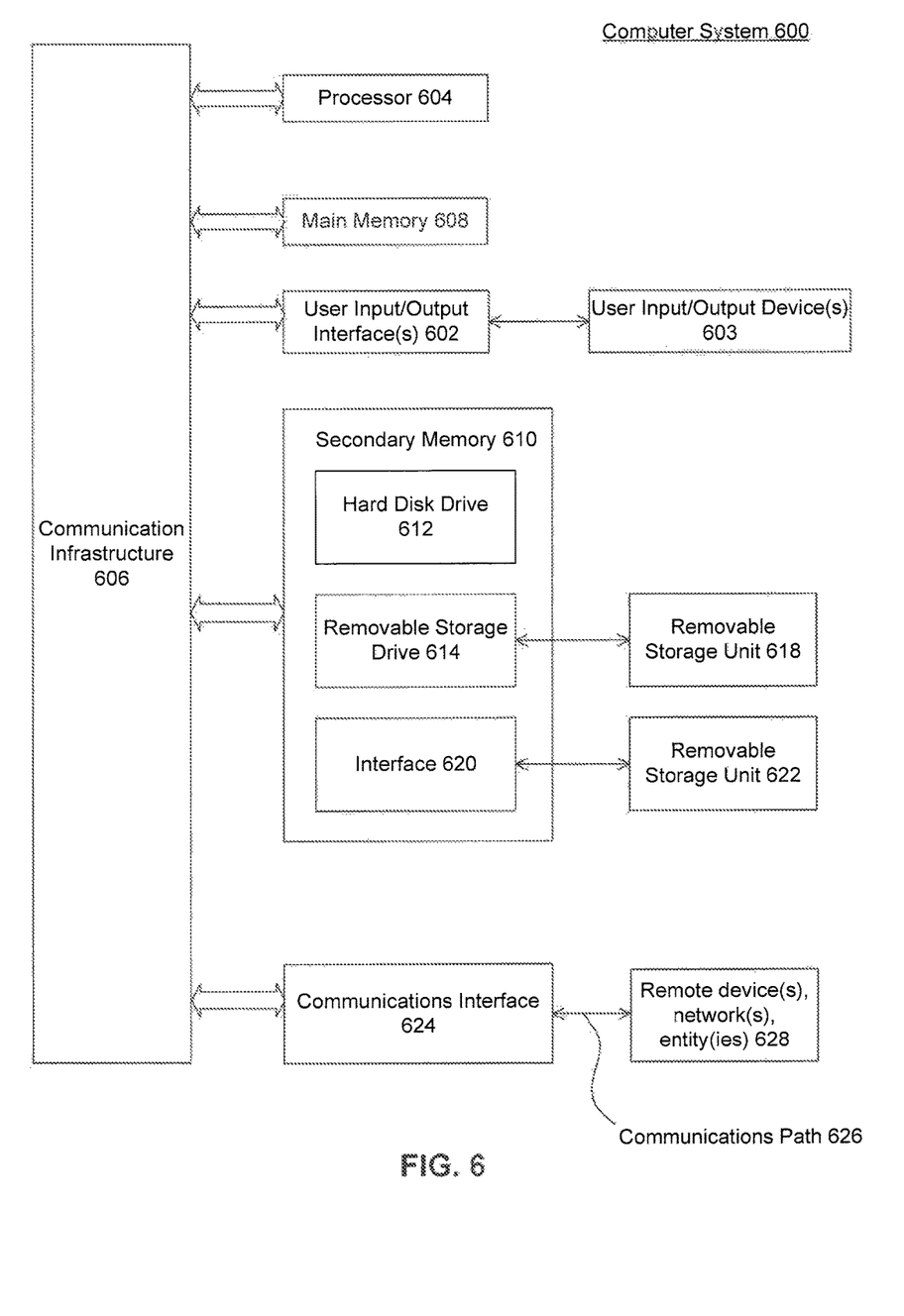
FIG. 6 is an example computer system useful for implementing various embodiments.

Various embodiments of the present disclosure can be implemented, for example, using one or more well-known computer systems, such as computer system 600 shown in FIG. 6. Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 6. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method, comprising:
receiving, by at least one processor, a request to export a database table in a database management system;
iterating, by the at least one processor, through multi-version concurrency control (MVCC) information associated with each row in the database table to identify temporary creation and deletion timestamps of rows, each temporary timestamp associated with a database transaction;
generating, by the at least one processor, a timestamp map, the timestamp map comprising a plurality of entries associating the identified temporary timestamps with commit timestamps of the associated transactions; and
writing, by the at least one processor, the table rows, the associated MVCC information, the timestamp map, and a snapshot timestamp of the export transaction to a binary file;
receiving, by the at least one processor, a request to import the database table from the binary file;
reconstructing, by the at least one processor, a database table from the table rows, the associated MVCC information, the timestamp map, and the snapshot timestamp of the export transaction in the binary file by updating a visibility of each table row based on comparing the commit timestamps of transactions from the timestamp map that are associated with the table row with the snapshot timestamp of the export transaction.

2. The method of claim 1, the generating further comprising, for each identified temporary timestamp:
determining whether the associated database transaction has committed;
in the event that the associated transaction has committed, retrieving a commit timestamp from a transaction control block of the associated transaction; and
in the event that the retrieved commit timestamp is less than or equal to the snapshot timestamp of the export transaction, creating an entry in the timestamp map that associates the temporary timestamp with the retrieved commit timestamp of the associated transaction.

3. The method of claim 2, the generating further comprising, for each identified temporary timestamp:
determining whether the export is part of an internal transaction initiated by the database management system;
in the event that the export is part of an internal transaction and the associated transaction of the temporary timestamp initiated the export request, creating an entry in the timestamp map that associates the temporary timestamp with a predefined commit timestamp;

wherein the predefined commit timestamp indicates that the associated transaction should be evaluated as a transaction that has committed prior to the snapshot timestamp of the export transaction.

4. The method of claim 1, the reconstructing further comprising:
importing the database rows and associated MVCC information from the binary file;
identifying timestamps in the imported MVCC information; and
for each identified timestamp:
in the event that the timestamp is a temporary timestamp, determining whether the temporary timestamp exists in the timestamp map;
in the event that the temporary timestamp exists in the timestamp map and the associated commit timestamp from the timestamp map is less than or equal to the snapshot timestamp of the export transaction, replacing the temporary timestamp with the associated commit timestamp from the timestamp map;
in the event that the temporary timestamp does not exist in the timestamp map or the associated commit timestamp from the timestamp map is greater than the snapshot timestamp of the export transaction, replacing the temporary timestamp with an unassigned value; and
updating a row state for the row associated with the identified timestamp, the row state indicating the visibility of the row.

5. The method of claim 4, the updating further comprising:
retrieving a creation timestamp and a deletion timestamp from the MVCC information associated with the row;
in the event that the creation timestamp is unassigned or the deletion timestamp is less than the snapshot timestamp of the export transaction, setting the row state of the row to a value indicating that the row is not visible; and
in the event that the creation timestamp is less than the snapshot timestamp of the export transaction and the deletion timestamp is either unassigned or greater than the snapshot timestamp of the export transaction, setting the row state of the row to a value indicating that the row is visible.

6. The method of claim 1, wherein the MVCC information associated with each database row comprises one or more MVCC blocks, and wherein creation and deletion timestamps of the row are contained in separate MVCC blocks.

7. A system, comprising:
a memory; and
at least one processor coupled to the memory and configured to:
receive a request to export a database table in a database management system;
iterate through multi-version concurrency control (MVCC) information associated with each row in the database table to identify temporary creation and deletion timestamps of rows, each temporary timestamp associated with a database transaction;
generate a timestamp map, the timestamp map comprising a plurality of entries associating the identified temporary timestamps with commit timestamps of the associated transactions; and
write the table rows, the associated MVCC information, the timestamp map, and a snapshot timestamp of the export transaction to a binary file;
receive a request to import the database table from the binary file;
reconstruct a database table from the table rows, the associated MVCC information, the timestamp map, and the snapshot timestamp of the export transaction in the binary file by updating a visibility of each table row based on comparing the commit timestamps of transactions from the timestamp map that are associated with the table row with the snapshot timestamp of the export transaction.

8. The system of claim 7, wherein to generate a timestamp map the at least one processor is further configured to, for each identified temporary timestamp:
determine whether the associated database transaction has committed;
in the event that the associated transaction has committed, retrieve a commit timestamp from a transaction control block of the associated transaction; and
in the event that the retrieved commit timestamp is less than or equal to the snapshot timestamp of the export transaction, create an entry in the timestamp map that associates the temporary timestamp with the retrieved commit timestamp of the associated transaction.

9. The system of claim 8, wherein to generate a timestamp map the at least one processor is further configured to, for each identified temporary timestamp:
determine whether the export is part of an internal transaction initiated by the database management system;
in the event that the export is part of an internal transaction and the associated transaction of the temporary timestamp initiated the export request, create an entry in the timestamp map that associates the temporary timestamp with a predefined commit timestamp;
wherein the predefined commit timestamp indicates that the associated transaction should be evaluated as a transaction that has committed prior to the snapshot timestamp of the export transaction.

10. The system of claim 7, wherein to reconstruct a database table the at least one processor is further configured to:
import the database rows and associated MVCC information from the binary file;
identify timestamps in the imported MVCC information; and
for each identified timestamp:
in the event that the timestamp is a temporary timestamp, determine whether the temporary timestamp exists in the timestamp map;
in the event that the temporary timestamp exists in the timestamp map and the associated commit timestamp from the timestamp map is less than or equal to the snapshot timestamp of the export transaction, replace the temporary timestamp with the associated commit timestamp from the timestamp map;
in the event that the temporary timestamp does not exist in the timestamp map or the associated commit timestamp from the timestamp map is greater than the snapshot timestamp of the export transaction, replace the temporary timestamp with an unassigned value; and
update a row state for the row associated with the identified timestamp, the row state indicating the visibility of the row.

11. The system of claim 10, wherein to update a row state the at least one processor is configured to:
retrieve a creation timestamp and a deletion timestamp from the MVCC information associated with the row;

in the event that the creation timestamp is unassigned or the deletion timestamp is less than the snapshot timestamp of the export transaction, set the row state of the row to a value indicating that the row is not visible; and in the event that the creation timestamp is less than the snapshot timestamp of the export transaction and the deletion timestamp is either unassigned or greater than the snapshot timestamp of the export transaction, set the row state of the row to a value indicating that the row is visible.

12. The system of claim 7, wherein the MVCC information associated with each database row comprises one or more MVCC blocks, and wherein creation and deletion timestamps of the row are contained in separate MVCC blocks.

13. A tangible non-transitory computer-readable device having instructions stored thereon that, when executed by at least one computing device, causes the at least one computing device to perform operations comprising:

receiving a request to export a database table in a database management system;

iterating through multi-version concurrency control (MVCC) information associated with each row in the database table to identify temporary creation and deletion timestamps of rows, each temporary timestamp associated with a database transaction;

generating a timestamp map, the timestamp map comprising a plurality of entries associating the identified temporary timestamps with commit timestamps of the associated transactions; and writing the table rows, the associated MVCC information, the timestamp map, and a snapshot timestamp of the export transaction to a binary file;

receiving, by the at least one processor, a request to import the database table from the binary file;

reconstructing, by the at least one processor, a database table from the table rows, the associated MVCC information, the timestamp map, and the snapshot timestamp of the export transaction in the binary file by updating a visibility of each table row based on comparing the commit timestamps of transactions from the timestamp map that are associated with the table row with the snapshot timestamp of the export transaction.

14. The tangible non-transitory computer-readable device of claim 13, the generating further comprising, for each identified temporary timestamp:

determining whether the associated database transaction has committed;

in the event that the associated transaction has committed, retrieving a commit timestamp from a transaction control block of the associated transaction; and in the event that the retrieved commit timestamp is less than or equal to the snapshot timestamp of the export transaction, creating an entry in the timestamp map that associates the temporary timestamp with the retrieved commit timestamp of the associated transaction.

15. The tangible non-transitory computer-readable device of claim 14, the generating further comprising, for each identified temporary timestamp:

determining whether the export is part of an internal transaction initiated by the database management system;

in the event that the export is part of an internal transaction and the associated transaction of the temporary timestamp initiated the export request, creating an entry in the timestamp map that associates the temporary timestamp with a predefined commit timestamp;

wherein the predefined commit timestamp indicates that the associated transaction should be evaluated as a transaction that has committed prior to the snapshot timestamp of the export transaction.

16. The computer-readable device of claim 13, the reconstructing further comprising:

importing the database rows and associated MVCC information from the binary file;

identifying timestamps in the imported MVCC information; and for each identified timestamp:
in the event that the timestamp is a temporary timestamp, determining whether the temporary timestamp exists in the timestamp map;
in the event that the temporary timestamp exists in the timestamp map and the associated commit timestamp from the timestamp map is less than or equal to the snapshot timestamp of the export transaction, replacing the temporary timestamp with the associated commit timestamp from the timestamp map;
in the event that the temporary timestamp does not exist in the timestamp map or the associated commit timestamp from the timestamp map is greater than the snapshot timestamp of the export transaction, replacing the temporary timestamp with an unassigned value; and
updating a row state for the row associated with the identified timestamp, the row state indicating the visibility of the row.

17. The tangible non-transitory computer-readable device of claim 16, the updating further comprising:

retrieving a creation timestamp and a deletion timestamp from the MVCC information associated with the row;

in the event that the creation timestamp is unassigned or the deletion timestamp is less than the snapshot timestamp of the export transaction, setting the row state of the row to a value indicating that the row is not visible; and in the event that the creation timestamp is less than the snapshot timestamp of the export transaction and the deletion timestamp is either unassigned or greater than the snapshot timestamp of the export transaction, setting the row state of the row to a value indicating that the row is visible.

* * * * *